Nov. 14, 1961   W. C. HOWARD   3,008,531
FLUID DRIVE SYSTEM
Filed Sept. 3, 1958   4 Sheets-Sheet 1
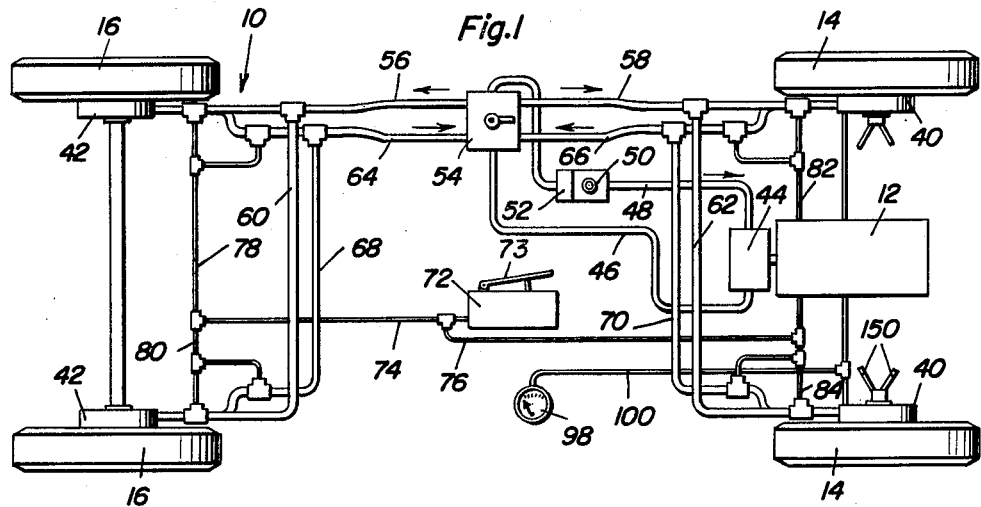
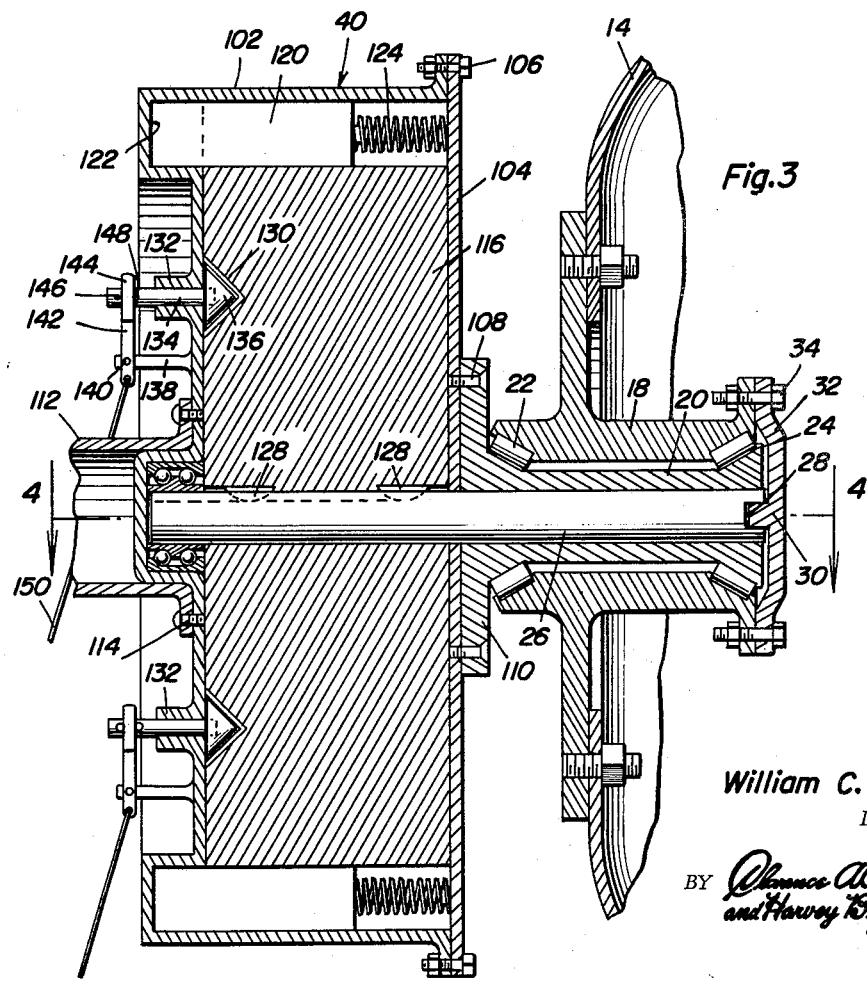
William C. Howard
INVENTOR.

Nov. 14, 1961     W. C. HOWARD     3,008,531
FLUID DRIVE SYSTEM
Filed Sept. 3, 1958     4 Sheets-Sheet 2
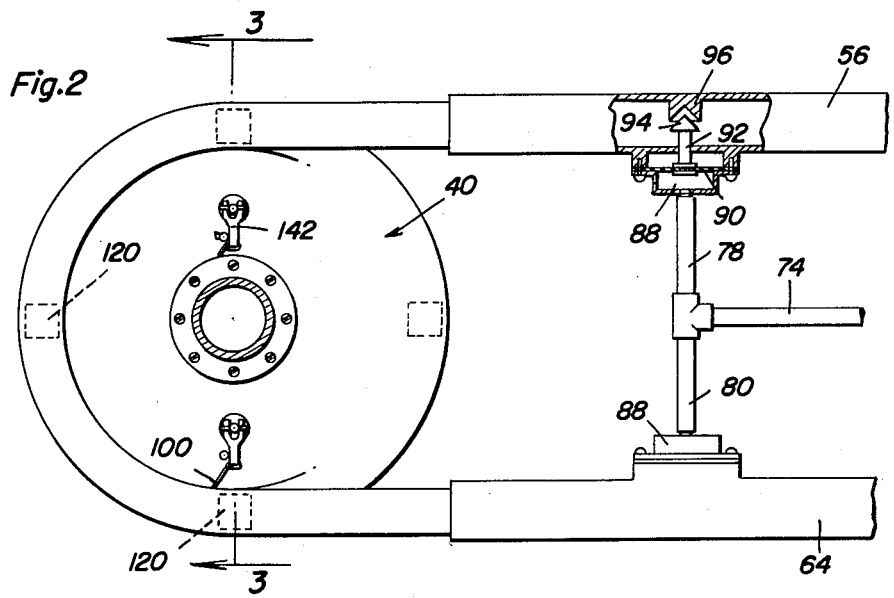
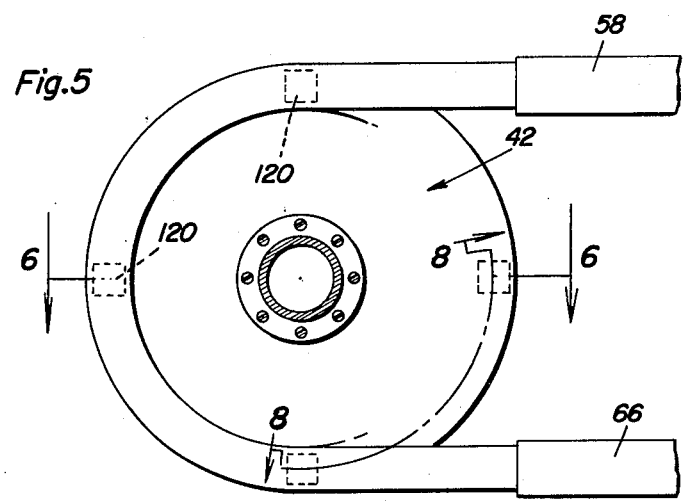
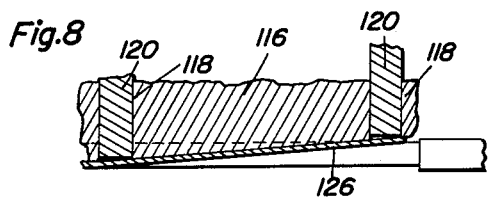
William C. Howard
INVENTOR.

Nov. 14, 1961 W. C. HOWARD 3,008,531
FLUID DRIVE SYSTEM
Filed Sept. 3, 1958 4 Sheets-Sheet 3

William C. Howard
INVENTOR.

Nov. 14, 1961 — W. C. HOWARD — 3,008,531
FLUID DRIVE SYSTEM
Filed Sept. 3, 1958 — 4 Sheets-Sheet 4
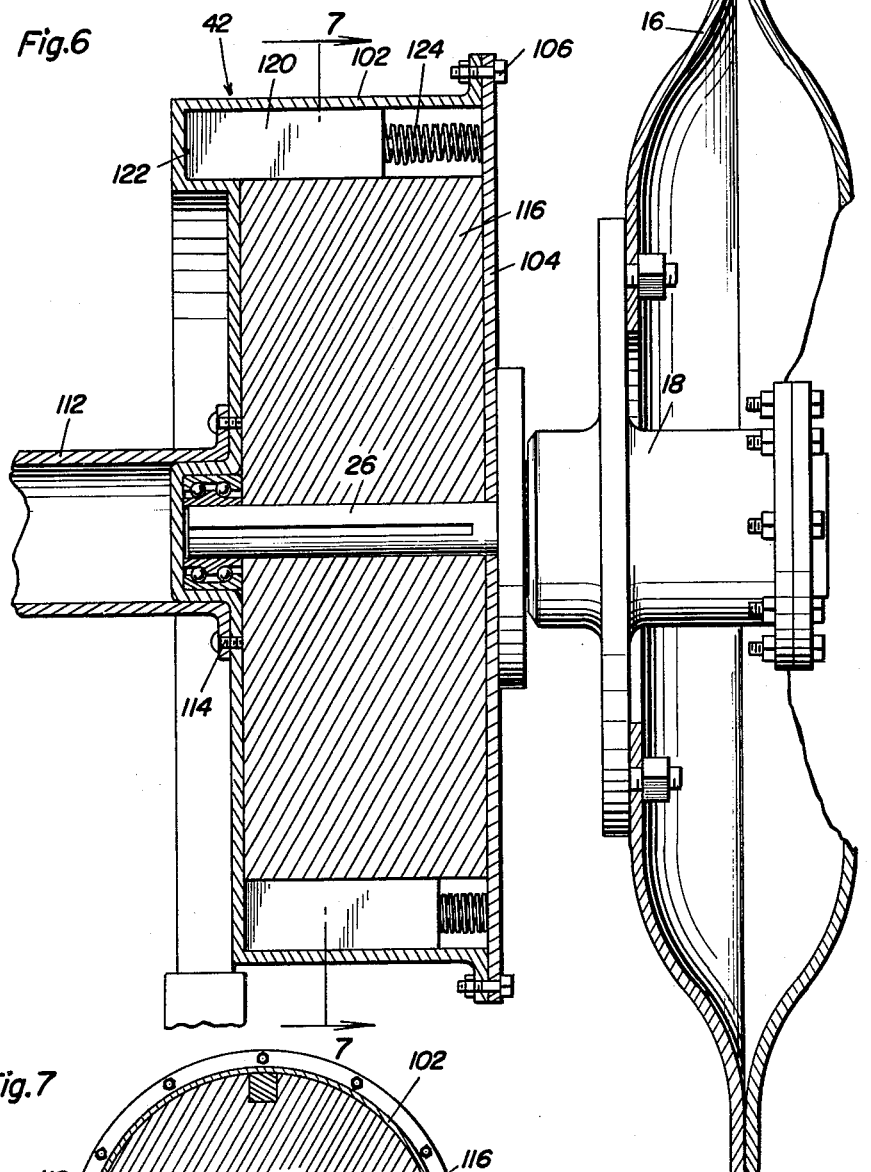
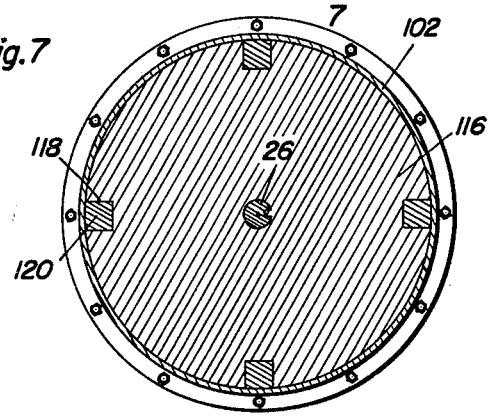
William C. Howard
INVENTOR.

United States Patent Office 3,008,531
Patented Nov. 14, 1961

3,008,531
FLUID DRIVE SYSTEM
William C. Howard, Box 638, Olden, Tex., assignor of forty percent to Fred Garcia, twenty-five percent to Frank Hernandez, five percent to R. C. Ferguson, and five percent to W. D. R. Owen
Filed Sept. 3, 1958, Ser. No. 758,719
8 Claims. (Cl. 180—66)

This invention comprises a novel and useful fluid drive system and more specifically relates to an arrangement whereby power may be transferred between a driving and driven element by means of a circulating fluid column therebetween in an improved manner, and particularly to the application of such a system to an automotive vehicle.

The primary and basic object of this invention is to provide a system whereby power may be readily and controllably transferred by means of a circulating fluid medium from a driving member to one or more driven members.

A further object of the invention is to provide an arrangement in accordance with the foregoing object which shall be specifically adapted for use in automotive vehicles as a means for connecting the power plant of the vehicle to the wheels of the same, and which may be utilized both to propel the vehicle as well as to constitute a braking system for the same.

A further object of the invention is to provide a power transmitting system in accordance with the foregoing objects wherein the power transmitted by the system and the motion transmitted thereby may be accurately and positively controlled between zero and a maximum.

Yet another object of the invention is to provide a power transmitting system especially adapted for use with motor vehicles whereby a positive control of power between a power plant and the wheels of the vehicle may be effected; and whereby the pump units connected to the wheels may also be utilized as part of a parking brake system for the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic view showing in top plan a conventional automotive vehicle chassis to which the principles of this invention have been applied;

FIGURE 2 is a fragmentary view in elevation of one of the rear wheel fluid motor units of this invention showing the fluid supply and return conduits associated therewith parts being broken away and parts showing in vertical section the flow control means of the unit and certain concealed parts being shown in dotted lines therein;

FIGURE 3 is a vertical transverse sectional view upon an enlarged scale through a rear wheel motor unit, parts being broken away and omitted, and taken substantially upon the plane indicated by the section line 3—3 of FIGURE 2;

FIGURE 5 is a view similar to FIGURE 2 but of a front wheel motor unit in accordance with this invention;

FIGURE 6 is a horizontal sectional detail view taken upon an enlarged scale substantially upon the plane indicated by the section line 6—6 of FIGURE 5; and showing by a comparison with FIGURE 3 the difference between the motor units of the front and rear wheels of the vehicle in accordance with the system of this invention;

FIGURE 7 is a detail view taken in vertical transverse section upon a reduced scale and substantially upon the plane indicated by the section line 7—7 of FIGURE 6; and FIGURE 8 is a detail view taken substantially as represented by the section line 8—8 of FIGURE 5.

Figure 4:
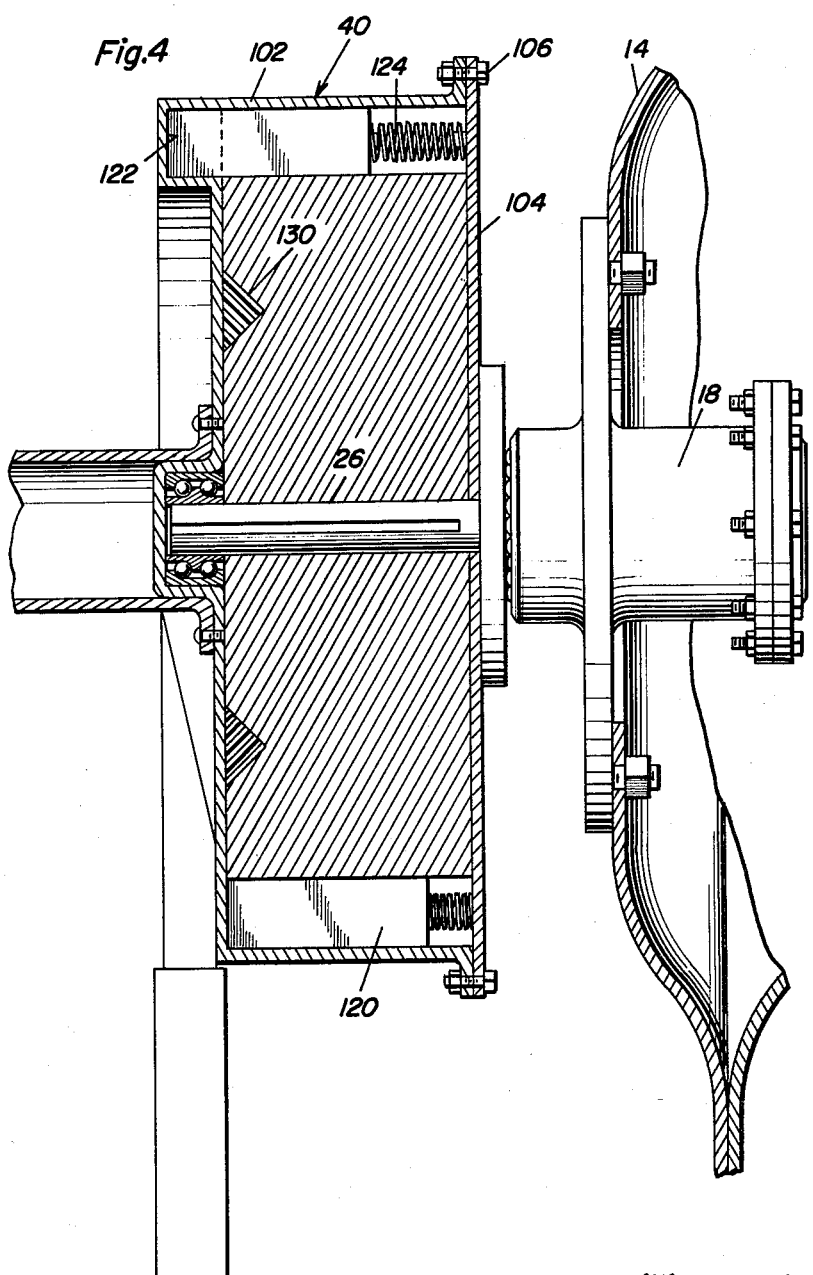
FIGURE 4 is a horizontal sectional view taken substantially upon the plane indicated by the section line 4—4 of FIGURE 3, parts being shown in section and parts being broken away and omitted.

It is the basic intent of this invention to provide a greatly improved and a superior system for the transfer of power and motion from a driving member to one or more driven members and whereby the mechanical connections and mechanisms therebetween are reduced to a minimum; and wherein the control of the rate of speed of the driven member and the power transmitted thereto may be very accurately controlled between zero and a maximum; and to provide in such a system, when applied to the wheels of a motor vehicle, an inherent and highly effective braking action upon the vehicle; and yet which will lend itself to the application thereto of a parking brake for the vehicle.

Although the power and motion transmitting system forming the subject matter of this invention and disclosed herein and claimed hereinafter is of general application, it is also especially well adapted for use in connection with an automotive vehicle, and in the accompanying drawings the application of this invention to an automotive vehicle has been illustrated throughout. It is believed it will be readily apparent, however, that many features of this invention are of general application to the transmission and control of power transmission between a driving and a driven member.

In the accompanying drawings, the numeral 10 designates generally the chassis of a motor vehicle, the same including the usual engine 12, front wheels 14 and rear wheels 16.

As will be apparent from a comparison of FIGURES 3, 4, and 6, the wheels 16 and 14 include hub portions 18 in which are journaled the hollow shafts or axles 20 by means of thrust bearings 22 and 24, and in which axles or shafts 20 there is rotatably mounted the stub axles or spindles 26 which are notched or recessed at one end as at 28 and are then splined to or keyed to a projection 30 carried by the hub cover plate 32 and which is secured to the hub by means of fasteners 34. Operatively connected with each of the vehicle wheels for driving the same or applying a braking effect thereto are motor units, those of the rear wheels being designated generally by the numerals 40 while those for the front wheels and which may be of a slightly different construction are indicated by the numerals 42.

The power transmitting or fluid drive system of this invention, as applied to an automotive vehicle consists of a source of power such as a fluid pump 44 of any desired character and which is directly coupled to and driven by the motor or power plant 12. The pump 44 constitutes the source of power or the driving member of the system as referred to hereinafter.

The units 40 and 42 constitute the driven members of the system, and the driven members are operatively connected to the source of power by means of a fluid supply or delivery line or conduit 46 and a fluid return line or conduit 48. Conveniently, the fluid return conduit 48 may include therein a fluid reservoir 50 together with a fluid filtering means 52 of any desired construction whereby the system may be maintained filled with fluid and the fluid may be cleaned during its circulation.

The conduits 46 and 48 are connected to a master control valve 54 of any suitable construction. This valve receives the fluid under pressure discharged thereinto by the fluid delivery conduit or line 46, and delivers this fluid pressure as directed by the valve through appropriate branch conduits to the various motor or driven units; while the return conduit 48 receives from the master control valve the fluid returned thereto by the various branch conduits from the wheel motor units, delivers the fluid to the filter unit 52 and through the reservoir 50 back to the inlet of the pump 44. The control valve is of such construction that it has a built-in spring-loaded or adjustable bypass means whereby the fluid above a predetermined pressure may be bypassed into the return line and thus not find its way into the branch lines of the motor units; together with means for reversing the direction of flow through the motor units to thus reverse the direction of travel of the vehicle; and further with means whereby the proportion of the fluid circulated through the conduits 46 and 48 and which is to be delivered to the motor units can be regulated between zero and a maximum.

Inasmuch as numerous types of fluid pressure control valves for fluid circulating systems are available to perform this purpose, and inasmuch as the principles of this invention are in no way limited to any particular construction of valve other than it be of a type having the characteristics above enumerated, a description of the detailed construction of the valve is deemed to be unnecessary and therefore has been omitted from this application.

As a suitable form of conduit system to which the principles of this invention may be applied, FIGURE 1 designates a pair of branch supply conduits 56 and 58 which deliver the fluid under pressure from the source of pressure respectively to the front and rear wheel units 42 and 40. For this purpose, the conduit 56 in turn is provided with a branch conduit 60 which extends transversely of the chassis and with the conduit 56 supplies both of the rear wheel units, while a similar conduit 62 communicating with the branch conduit 58 serves with the latter to supply fluid pressure to the two front wheel units 40.

In a similar manner, the fluid return conduit 48 through the master control valve communicates with a pair of branch return conduits 64 and 66 which with their associated auxiliary branch conduits 68 and 70 effect the return of fluid from the motor units of the front and rear wheels.

As so far described, dependent upon the setting of the master control valve 54, it will be understood that the continuously operating fluid pump 44 will circulate fluid under pressure from this pump through the master control valve, and back to the pump. From the master control valve in turn, depending upon the setting of the same, an adjusted and controlled flow of fluid to the individual wheel units and from the same will be effected. Thus, the power to be applied from the power plant 12 to the wheels of the vehicle can be readily regulated and thus the speed of the vehicle controlled either forward or backward.

The power transmitting system above described also has built in a brake means for the vehicle. This brake means is hydraulically actuated and in turn controls and regulates the rate of fluid flow through the motor or driven units of the system in order to obtain a regulated braking action thereon. For this purpose there is provided a manually operable pump cylinder 72 which is actuated by a foot pedal 73 similar to the accelerator pedal of a motor vehicle. Since the details of the brake actuating pump cylinder 72 are immaterial to an understanding of the invention claimed herein, a description of the same is deemed to be unnecessary. However, actuation of the pedal 73 serves to exert a force or pressure in the hydraulic fluid received in the actuating conduits 74 and 76 which are connected to the discharge end of the pump cylinder. These two conduits by means of their brake actuating branch conduits 78 and 80 for the conduit 74 and 82 and 84 for the conduit 76 control the circulation of fluid through the motor units. Referring to FIGURE 2 it will be seen that the branch conduits 78 and 80 each communicate with a fluid pressure actuating chamber 88 having an actuating diaphragm 90 therein to which is secured for actuation thereby the stem 92 of a flow control valve 94. As will be noted, the valve 94 cooperates with a valve seat 96 which is formed in each of the conduits 56, 58, 60, 62 and 64, 66, 68 and 70 of the fluid supply and return lines of the system. The assembly consisting of the elements 88, 90, 92, 94 and 96 constitutes a fluid pressure actuated control valve or flow control means for each of the fluid supply and delivery conduits of the system.

It will be understood that the same flow control valve means is provided to control the operation of each of the wheel units 40 or 42. Depending upon the extent to which the pedal 74 is depressed, the valve 94 will be urged towards its seat 96 thereby positively controlling the flow through the conduits with which these valves are associated to thus vary the flow between zero and a maximum. When the valves are completely closed, fluid flow into and out of the motor units is completely blocked, thereby locking the motor units and the wheels associated therewith and producing the maximum braking effect upon the vehicle. Obviously, by closing these valves 94 against their seats 96 to a varying extent, a varying braking action can be obtained.

If desired, a pressure gauge 98, may be connected as by a conduit 100 with any of the conduits or with the interior of the motor units in order to register the fluid pressure prevailing therein.

Reference is now made specifically to FIGURES 3, 4, 6–8 for an understanding of a suitable construction of a fluid pressure actuated motor comprising the driven elements of this invention, the wheel or motor units 40 being very similar in construction to the units 42, except for the presence or absence of the parking brake arrangement as set forth hereinafter.

It will be understood that numerous conventional constructions of fluid pressure actuated motors may be employed as the driven units 40 and 42, and that the invention therefore is in its broader aspect to be not limited to any particular type of fluid pressure driven motor. As illustrated, each of the motor units consists of a cylindrical casing 102 having a closure wall or plate 104 on one side thereof secured as by fastening bolts 106. This wall in turn is secured as by the fasteners 108 to the flange 110 carried by the previously mentioned hollow axles or shafts 20 and may be also secured as by a vehicle axle or frame member 112 to which the integral end wall of the casing 102 is attached as by fasteners 114, whereby the casing is held stationary with respect to the vehicle chassis.

Revoluble within the cylindrical chamber of the casing 102 is a rotor 116 which as shown in FIGURE 7 substantially fills the diameter of this chamber, being provided with a plurality of longitudinally extending peripheral slots 118 which may be rectangular in cross section and which slidably receive therein blades or vanes 120 which constitute the elements of the rotor subject to the pressure of the hydraulic or fluid medium circulated through the unit.

At its fixed end wall, the casing 102 is provided with a laterally extending annular channel 122 which is of the same radial extent as that of the vanes or blades 120 and in which the ends of these blades slide, spring means 124 serving to yieldingly retain the blades or vanes in abutment against the annular end wall of the channel 122.

As will be more readily understood from FIGURES 3 and 5, the supply and return conduits of the system communicate peripherally with this channel at diametrically opposite portions thereof so that this fluid in traveling about the channel from the delivery conduit to the return conduit will impact and exert pressure against the vanes or blades 120 in that portion of the channel and thus impart rotation to the rotor 116.

However, as better indicated in FIGURES 8 and 4 in conjunction with FIGURE 5, it will be observed that there is provided a cam member 126 which at this portion of their rotation through the annular chamber serves to move or force the blades or vanes inwardly against their springs, whereby the passage of fluid into and out of the opposite sides of the channel is effected.

It will thus be apparent that circulation of fluid in either direction through the 180 degree active portion of the channel will cause rotation of a rotor and through its connection by means of the keys or splines 128 with the spindle 26 and the connection of the latter at 28 and 30 with the cap 32 and thus with the hub 18 will impart rotation to the vehicle wheels 14 or 16.

Similarly, when the flow of fluid is throttled or stopped by the flow control valve means previously described, a braking action or effect will be imparted to the vehicle wheels.

In order that the vehicle to which the system is applied may have the usual parking brake which is auxiliary to the power brakes comprising the main brakes of the vehicle, the units 40 of the rear wheels are slightly modified from those 42 of the front wheels by the addition thereto of mechanism for this purpose.

As shown in FIGURE 3 the face of the casing 102 which is remote from the hub 18 is provided with a peripheral V-shaped groove 130 therein, the walls of which are preferably provided with serrations.

Slidable through bosses 132 are the stems 134 of V-shaped locking members 136, the divergent surfaces of the anchor or locking members 136 being likewise serrated. The arrangement is such that when the stem 134 is pressed inwardly, lock member 136 will be pressed into engagement with the groove 130 and thus positively prevent rotation of the rotor 116 relative to its casing 102. In order to selectively apply or release the engagement of the locking members with the V-shaped groove 130, there are provided standards 138 mounted upon the end wall of the casing 102 upon which is pivotally journaled or fulcrumed as by a pivot pin 140 a brake lever 142. The latter has a forked end 144 which straddles the stem 134, it being confined between a pair of transverse pins thereon 146 and 148. A cable or other suitable actuating member 150 serves to impart swinging movement to lever 142 and thus to shift the locking members 136 into or out of locking engagement with the locking groove 130 of the rotor.

Any suitable means may be employed, not shown, to actuate the cables 150.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle drive means including a source of fluid pressure, fluid motor units each drivingly connected to a wheel of a vehicle for effecting and controlling rotation of said wheel, a fluid delivery line and a fluid return line each connected to said source and to each of said motor units, flow control means positively controlling and regulating flow of fluid through each of said lines from zero to a maximum, each of said fluid motor units including a stationary casing, a rotor rotatably mounted in said casing, a circumferential brake groove in said rotor, a lock mechanism movably mounted on said casing and movable into and out of locking engagement with said groove.

2. A power transmitting system including a source of fluid pressure, a fluid pressure actuated motor a fluid delivery line and a fluid return line each connected to said source and said motor, flow control means positively controlling and regulating flow of fluid through each of said lines from zero to a maximum, said fluid motor unit including a stationary casing, a rotor rotatably mounted in said casing, a circumferential brake groove in said rotor, a lock mechanism movably mounted on said casing and movable into and out of locking engagement with said groove.

3. The combination of claim 1 wherein said locking mechanism includes a boss extending laterally therefrom having a bore formed therethrough in communication with the interior of said casing and registering with said groove, an elongated stem slidably received in said bore, a lock member secured to the inner end of said stem engageable with said groove, and means for moving said lock member into and out of locking engagement with said groove.

4. The combination of claim 3 wherein said last-mentioned means includes a standard mounted on said casing adjacent said boss, a brake lever pivotally secured intermediate its ends to said standard and having one end secured to the outer end of said stem and the other end connected to an actuating member whereby the latter may be moved to effect movement of said lock member into and out of locking engagement with said groove.

5. The combination of claim 4 wherein the confronting surfaces of said lock member and said groove are serrated.

6. The combination of claim 2 wherein said locking mechanism includes a boss extending laterally therefrom having a bore formed therethrough in communication with the interior of said casing and registering with said groove, an elongated stem slidably received in said bore, a lock member secured to the inner end of said stem engageable with said groove, and means for moving said lock member into and out of locking engagement with said groove.

7. The combination of claim 6, wherein said last-mentioned means includes a standard mounted on said casing adjacent said boss, a brake lever pivotally secured intermediate its ends to said standard and having one end secured to the outer end of said stem and the other end connected to an actuating member whereby the latter may be moved to effect movement of said lock member into and out of locking engagement with said groove.

8. The combination of claim 7, wherein the confronting surfaces of said lock member and said groove are serrated.

References Cited in the file of this patent

UNITED STATES PATENTS

| | | |
|---|---|---|
| 1,426,902 | Noel et al. | Aug. 22, 1922 |
| 1,803,932 | Dooley | May 5, 1931 |
| 2,009,862 | Spell | July 30, 1935 |
| 2,228,411 | Sheridan | Jan. 14, 1941 |
| 2,355,604 | Rupp | Aug. 15, 1944 |
| 2,529,787 | Shepelrich | Nov. 14, 1950 |
| 2,604,109 | Tuttle | July 22, 1952 |
| 2,748,879 | Bailey | June 5, 1956 |